US012271781B2

(12) United States Patent
DiGregorio et al.

(10) Patent No.: US 12,271,781 B2
(45) Date of Patent: Apr. 8, 2025

(54) PASS-THROUGH COLOR CAMERA WITHOUT SIGNAL

(71) Applicant: ZEBRA TECHNOLOGIES CORPORATION, Lincolnshire, IL (US)

(72) Inventors: Joseph F. DiGregorio, Seaford, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/237,825

(22) Filed: Aug. 24, 2023

(65) Prior Publication Data

US 2025/0068872 A1    Feb. 27, 2025

(51) Int. Cl.
*G06K 7/10* (2006.01)
*G06K 7/14* (2006.01)

(52) U.S. Cl.
CPC ......... *G06K 7/1447* (2013.01); *G06K 7/1097* (2013.01); *G06K 7/1098* (2013.01); *G06K 2007/10485* (2013.01); *G06K 7/1096* (2013.01)

(58) Field of Classification Search
None
See application file for complete search history.

(56) References Cited

U.S. PATENT DOCUMENTS

| | | | |
|---|---|---|---|
| 6,631,844 B1 * | 10/2003 | Ohkawa | G06K 7/1096 235/462.4 |
| 2023/0206732 A1 * | 6/2023 | Mistkawi | G07G 1/0018 235/454 |

* cited by examiner

*Primary Examiner* — Sonji N Johnson
*Assistant Examiner* — April A Taylor
(74) *Attorney, Agent, or Firm* — Yuri Astvatsaturov

(57) ABSTRACT

The present disclosure provides an indicia decoding device with a printed circuit board (PCB) that allows signals from internal imaging assemblies to pass through a sealed cavity boundary to an external host. This device comprises a decode module, an upright and horizontally mounted window, and multiple imaging assemblies housed within a sealed cavity. The PCB is partially located inside and outside the cavity, featuring ports inside and outside the sealed cavity. Signals from secondary imaging assemblies bypass the decode module, utilizing electrically conductive paths on the PCB, ensuring signal integrity without modification. The PCB may also include image processing circuitry, with results transmitted to the host.

10 Claims, 5 Drawing Sheets

PASS-THROUGH COLOR CAMERA WITHOUT SIGNAL

BACKGROUND

Indicia decoding devices often employ multiple imaging assemblies to gather information about objects passing through a field of view. These imaging assemblies are often located in one or more sealed cavities within the indicia decoding device, which are sealed to prevent ingress of dust and other foreign matter that might impair the functioning of the imaging assemblies. Modular construction techniques for these devices often require that one or more cables be routed from one or more imaging assemblies to a host system external to the one or more sealed cavities.

SUMMARY

Devices are provided herein that advantageously route signals from a vision imaging assembly to a host through a boundary of a sealed cavity. In an example embodiment, the present disclosure includes an indicia decoding device, comprising a decode module, an upright mounted window, a generally horizontally mounted window, a first set of one or more imaging assemblies having a combined field of view (FOV) configured to be projected into a product scanning region of the indicia decoding device, wherein at least one imaging assembly of the first set of the one or more imaging assemblies is configured to capture first image data and transmit the first image data to the decode module, a sealed cavity housing the first set of the one or more imaging assemblies, a printed circuit board (PCB) located partially inside of the sealed cavity and partially outside of the sealed cavity, a first port on the PCB inside of the sealed cavity, a second port on the PCB outside of the sealed cavity, and a second set of one or more imaging assemblies within the sealed cavity, wherein signals from the second set of the one or more imaging assemblies to a host communicatively coupled to the second port bypass the decode module and are routed through a boundary of the sealed cavity via one or more electrically conductive paths of the PCB between the first port and the second port.

In a variation of this example embodiment, the first port is one of a first Ethernet port or a first universal serial bus (USB) port, and the second port is one of a second Ethernet port or a second USB port.

In a variation of this example embodiment, the signals from the second set of the one or more imaging assemblies to the host are passed unmodified from the first port to the second port.

In a variation of this example embodiment, the one or more electrically conductive paths are electrically isolated from all other active circuitry of the PCB.

In a variation of this example embodiment, the PCB includes processing circuitry configured to perform image analysis, and no other circuit board of the indicia decoding device contains processing circuitry configured to perform image analysis.

In a variation of this example embodiment, results from the processing circuitry configured to perform image analysis are transmitted to the host.

In a variation of this example embodiment, power for the second set of the one or more imaging assemblies is passed from the second port to the first port.

In a variation of this example embodiment, an exit panel containing the second port faces in a direction chosen from a group consisting of substantially vertically downwards, substantially vertically upwards, substantially horizontal on an axis that is substantially orthogonal to a plane defined by the upright mounted window, facing away from the plane defined by the upright mounted window, substantially horizontal on an axis that is substantially orthogonal to the plane defined by the upright mounted window, facing towards the plane defined by the upright mounted window, and substantially horizontal on an axis that is substantially parallel to the plane formed by the upright mounted window.

In a variation of this example embodiment, the signals are not subject to any algorithmic modification while being routed via the one or more electrically conductive paths.

In a variation of this example embodiment, the PCB forms at least a portion of a wall of the sealed cavity.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
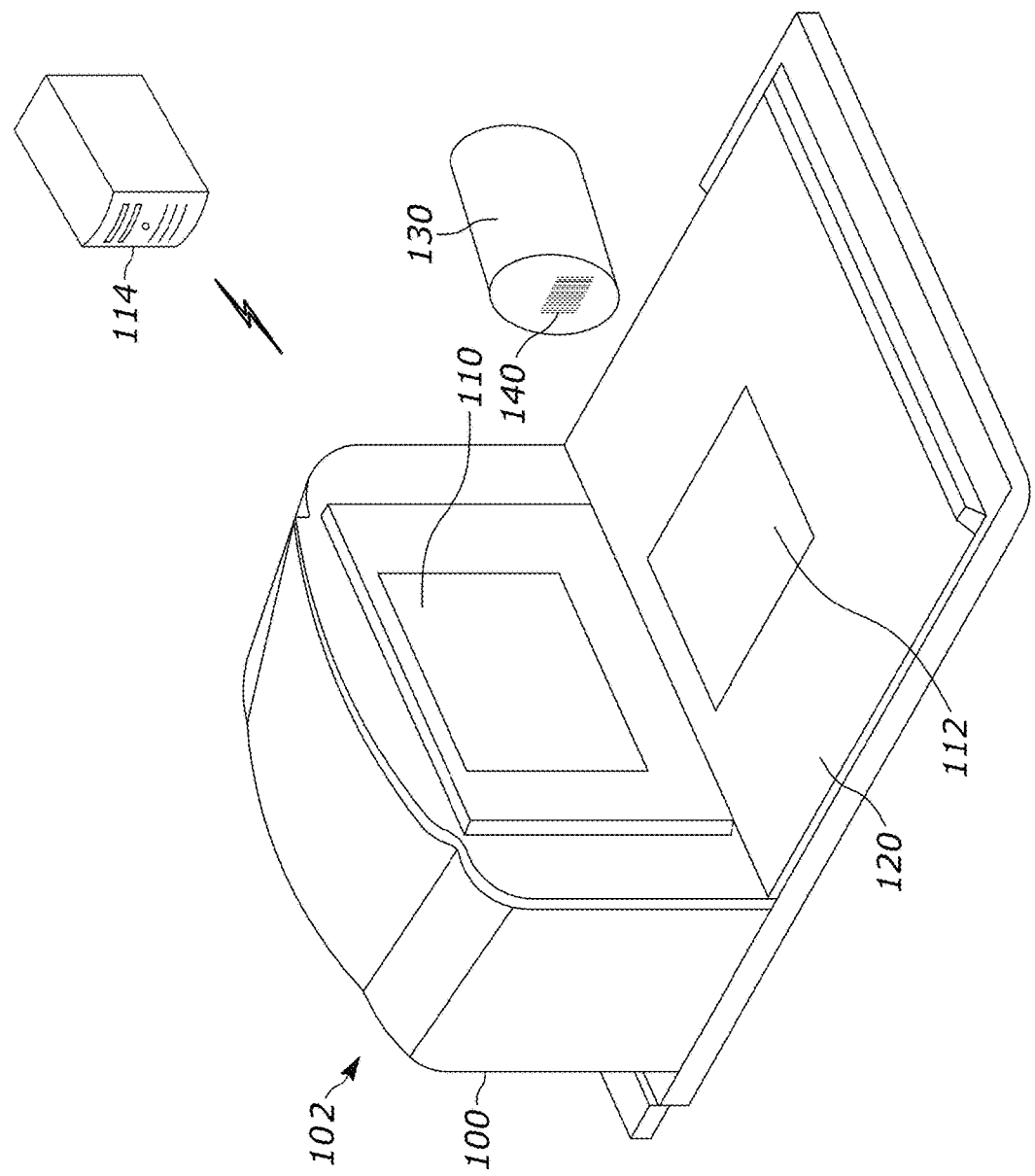
FIG. 1 illustrates an example indicia decoding device, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Devices are provided herein that advantageously route signals from a vision imaging assembly to a host through a boundary of a sealed cavity. Indicia decoding devices often include multiple imaging assemblies, with one or more imaging assemblies capturing images for the purposes of decoding indicia and one or more additional imaging assemblies capturing images for processing by one or more machine vision algorithms that may not involve decoding indicia. For example, an indicia decoding device may include a first vision assembly that transmits a first image to a decode module configured to decode an indicium in the first image. The same indicia decoding device may include a second imaging assembly that sends a second image to a vision module that detects and identifies objects in a field of view. In many indicia decoding devices, the first imaging assembly and the second imaging assembly are located within a sealed cavity to prevent ingress of dust, moisture, or any other foreign matter that may impair operation of the indicia decoding device.

As indicia decoding devices increase in complexity and modularity, increasing need arises for communication between components within the sealed cavity (e.g. the first imaging assembly and the second imaging assembly) and components outside of the sealed cavity (e.g. processing modules and host systems). This is particularly the case for the second imaging assembly in the above example, since imaging assemblies that are not directly involved in the indicia decoding process are often modular add-on components to a base system. This poses a problem when, for example, a vision imaging assembly communicates with a host system outside of the sealed cavity via a cable. Routing a cable through a boundary of the sealed cavity results in added complexity and provides a weak point where the seal may fail.

To solve the issues described above, a printed circuit board may be implemented which crosses the boundary of the sealed cavity. A first port may be provided on an interior side of the printed circuit board (i.e. a surface or end of the printed circuit board that is inside the sealed cavity) while a second port may be provided on an exterior side of the printed circuit board (i.e. a surface or end of the printed circuit board that is outside the sealed cavity). By directly connecting the first port with the second port, communication can be established between an imaging assembly within the sealed cavity and a host system outside of the sealed cavity without modification of the signal or complex cable routing through sealed boundaries.

FIG. 1 illustrates an example indicia decoding device 100, according to embodiments of the present disclosure. The indicia decoding device 100 includes an upright mounted window 110 and a generally horizontally mounted window 112 configured to allow internal components of the indicia decoding device 100 to view a product scanning region located above a platter 120. As an object 130 passes through the product scanning region, the internal components of the indicia decoding device 100 capture images of the object 130 and locate and decode an indicium 140 affixed to a surface of the object 130. The internal components of the indicia decoding device 100 may also utilize captured images of the object 130 to determine one or more characteristics of the object 130.

The indicia decoding device 100 may include separate subsystems of components for performing indicia decoding and item detection and analysis. For example, an indicia decoding imaging assembly may transmit data to an indicia decode module 102 that is configured to decode indicia, while a vision imaging assembly transmits data to a vision module that is configured to locate and identify objects in the product scanning region.

Figure 2:
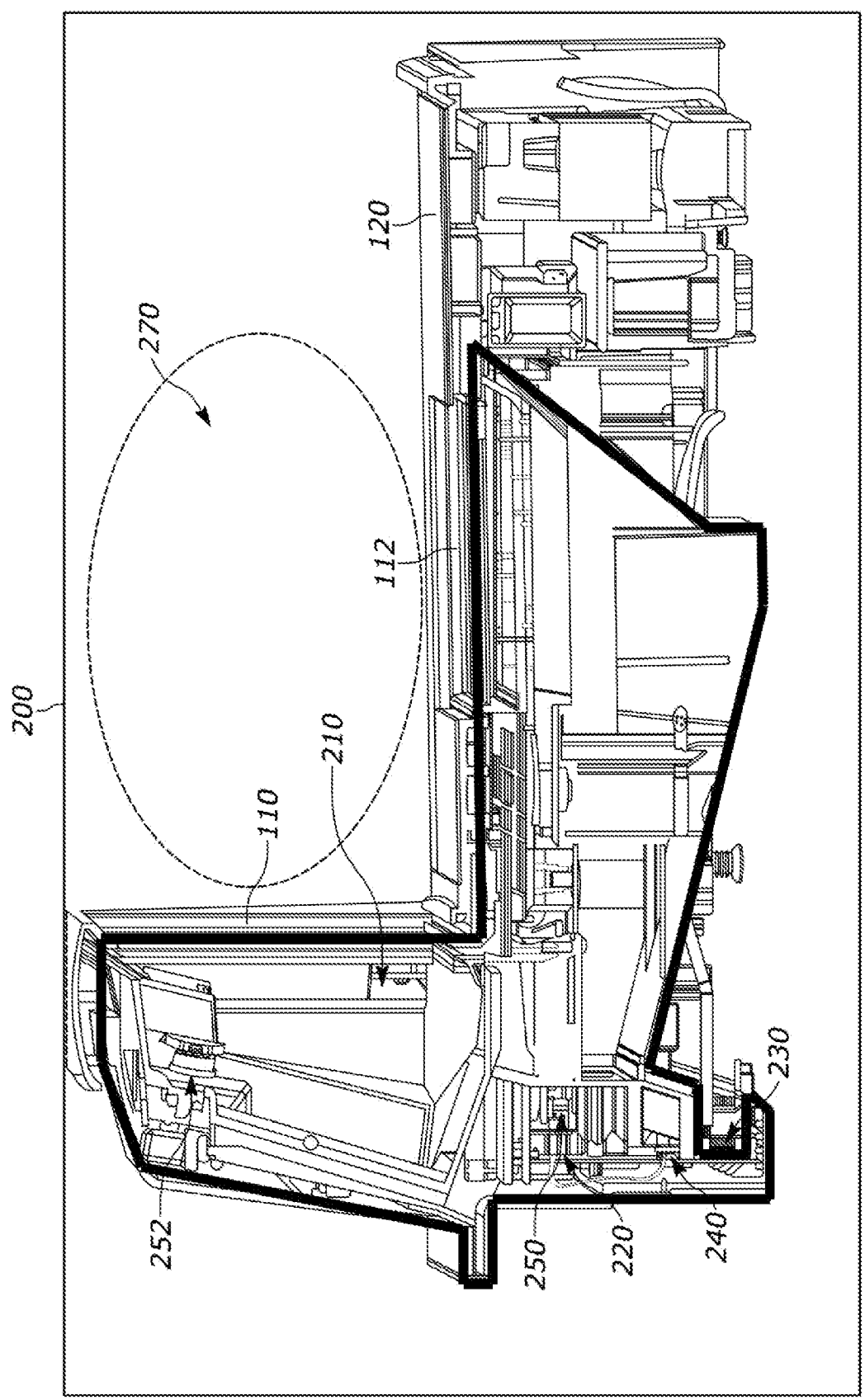
FIG. 2 illustrates a section view of an example indicia decoding device, according to embodiments of the present disclosure.

FIG. 2 illustrates a section view of an example indicia decoding device 200, according to embodiments of the present disclosure. The example indicia decoding device 200 includes a decode module (not illustrated) an upright mounted window 110 and a platter 120 with a generally horizontally mounted window 112. A first imaging assembly 250 has a field of view (FOV) configured to be projected into a product scanning region 270. The first imaging assembly 250 is configured to capture first image data and transmit the first image data to the decode module. The first imaging assembly may capture images of a quality that is low enough to be unsuitable for vision operations and may feed data directly to the decode module. The decode module may be configured with hardware or firmware that automatically decodes an indicium and transmits payload data to a host 114.

A sealed cavity 210 houses the first imaging assembly 250 and a second imaging assembly 252 configured to transmit signals to the host. The second imaging assembly 252 may capture images at a lower framerate and a higher quality than the first imaging assembly, allowing complex image analysis operations to be performed the could not be successfully carried out on images from the first imaging assembly 250. The host may be user-configurable and may perform software-based image processing with data from the second imaging assembly, but may not be part of the indicia decoding device 200. Signals from the second imaging assembly 252 to the host bypass the decode module and are routed through a boundary of the sealed cavity 210 via one or more electrically conductive paths of a printed circuit board 220 (PCB 220) between a first port 240 located inside the sealed cavity 210 on a surface of the PCB 220 and a second port 230 located outside the sealed cavity 210 on a surface of the PCB 220.

The first imaging assembly 250 and the second imaging assembly 252 may be located as shown within the indicia decoding device 200, or may be arranged in a different configuration. For example, the second imaging assembly 252 may be co-located with the first imaging assembly 250 to obtain visibility, via a splitter mirror, an upper fold mirror, and a lower fold mirror, of the product scanning region 270 through the upright mounted window 110 and the generally horizontally mounted window 112 simultaneously. The second imaging assembly 252 may alternatively be located below the generally horizontally mounted window 112 and configured to view the product scanning region 270 from below through the generally horizontally mounted window 112.

Figure 3:
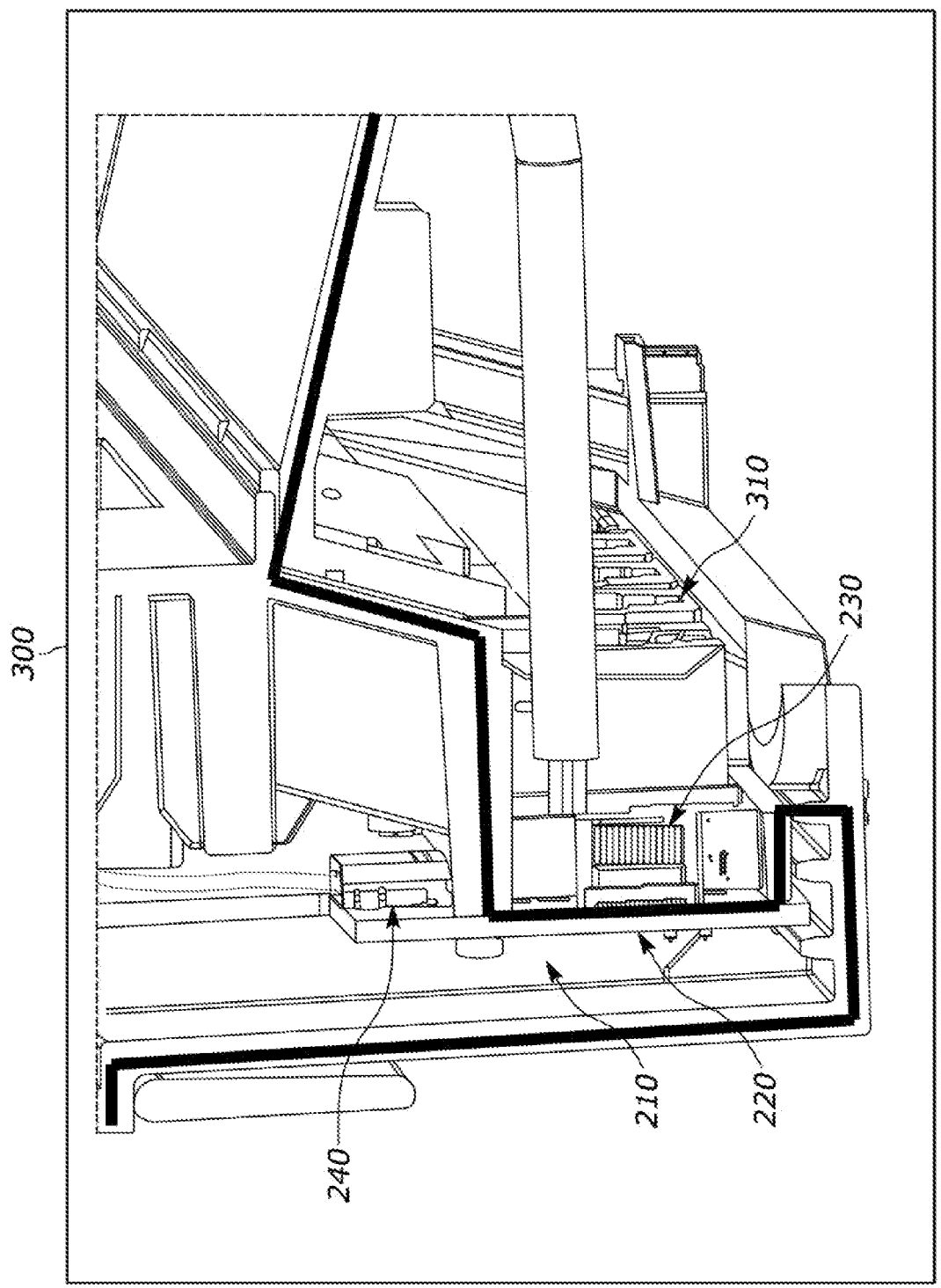
FIG. 3 illustrates a close section view of an example printed circuit board installed in an example indicia decoding device, according to embodiments of the present disclosure.

FIG. 3 illustrates a close section view of an example printed circuit board 220 (PCB 220) installed in an example indicia decoding device 300, according to embodiments of the present disclosure. A sealed cavity 210 contains a first imaging assembly and a second imaging assembly (see FIG. 2). The PCB 220 forms a portion of a wall of the sealed cavity 210, and is mated to a housing of the indicia decoding device 300 with a tortuous path seal in order to maintain an integrity of the sealed cavity 210. In lieu of a tortuous path seal, the sealed cavity may instead be sealed with a gasket, epoxy, or any other conventional means. A first port 240 located inside the sealed cavity 210 is affixed to a surface of the PCB 220. A second port 230 is affixed to a surface of the PCB 220 outside of the sealed cavity 210 and is part of an exit panel 310 of the indicia decoding device 300. The exit panel 310 contains a plurality of ports that the indicia decoding device 300 uses to connect to various peripherals and communicate with other devices and systems.

The first port 240 and the second port 230 may be electrically connected via a plurality of electrically conductive pathways of the PCB 220. These electrically conductive pathways may be electrically isolated from any other electrically conductive pathways or active circuitry of the PCB 220, and signals may be passed unmodified from the first port 240 to the second port 230. The electrically conductive pathways of the PCB 220 may also carry electrical power from the second port 230 to the first port 240 in order to supply power to a vision imaging assembly (see FIG. 2). The first port 240 and the second port 230 may be of any type, including but not limited to USB A, USB B, USB C, micro USB, mini USB, thunderbolt, and Ethernet.

Figure 4:
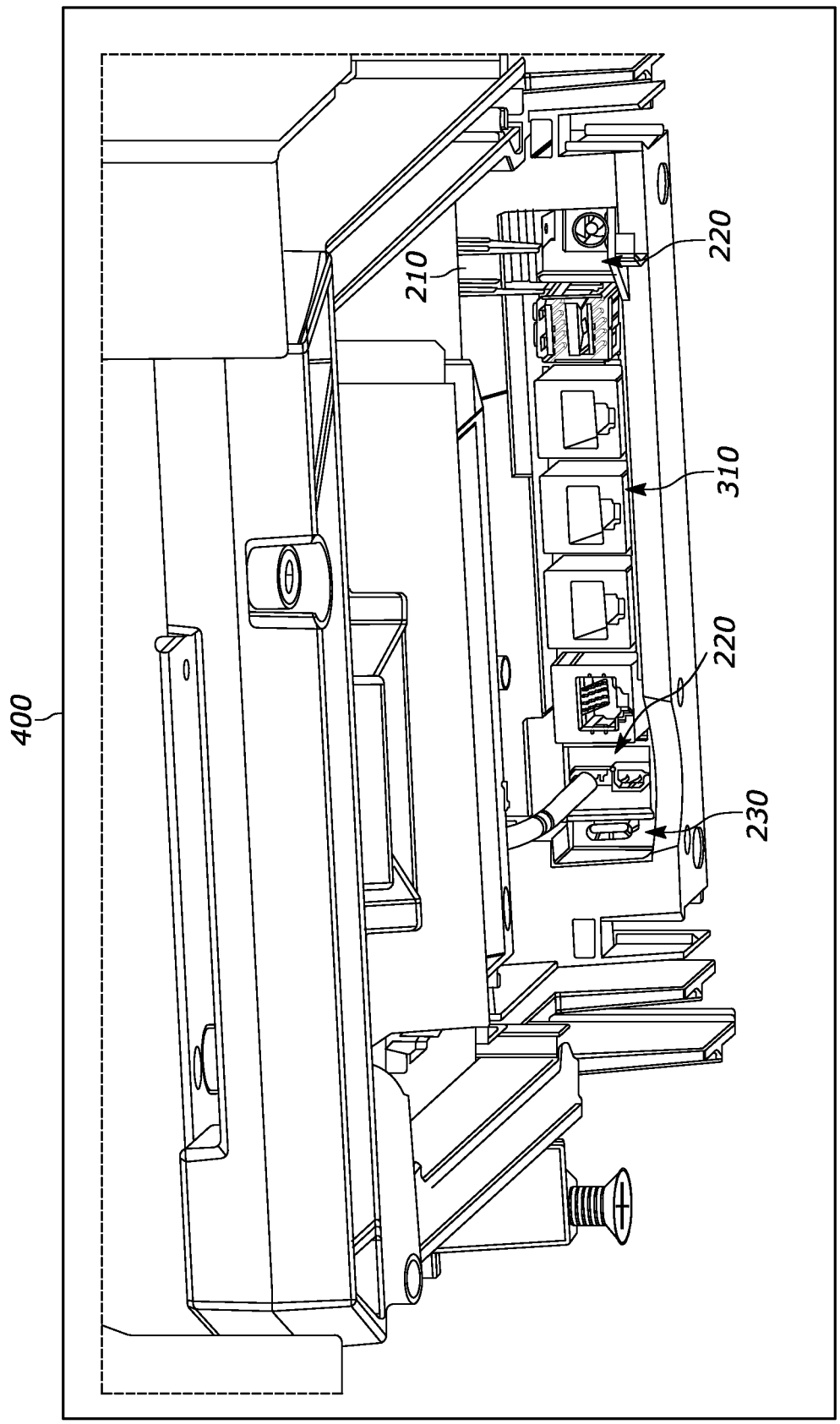
FIG. 4 illustrates an example exit panel, according to example embodiments of the present disclosure.

FIG. 4 illustrates an example exit panel 310 of an indicia decoding device 400, according to example embodiments of the present disclosure. The exit panel 310 is located adjacent to a printed circuit board 220 (PCB 220) outside of a sealed cavity containing a first imaging assembly, a second imaging assembly, and a first port (see FIG. 2 and FIG. 3). The exit panel 310 includes a second port 230 connected to the first port via electrically conductive pathways of the PCB 220.

The PCB 220 may include processing circuitry configured to perform image analysis, while no other circuit board of the indicia decoding device 400 contains processing circuitry configured to perform image analysis. For example, the PCB 220 is configured to receive images of indicia from the first imaging assembly and decode those indicia, but the electrically conductive pathways between the first port and the second port 230 are electrically isolated from circuitry on the PCB 220 that decodes indicia and signals from the first port to the second port 230 are passed without algorithmic modification. The PCB 220 may be configured to transmit results of the image analysis to a host system. In such a scenario, data from the second imaging assembly may be transmitted to the host system via the first port, the PCB 220, and the second port 230.

The exit panel 310 is illustrated as facing substantially horizontal on an axis that is substantially orthogonal to a plane defined by an upright mounted window, facing towards the plane defined by the upright mounted window. The exit panel 310 may, however, face in any other direction, including but not limited to substantially vertically downwards, substantially vertically upwards, substantially horizontal on an axis that is substantially orthogonal to a plane defined by the upright mounted window, facing away from the plane defined by the upright mounted window, substantially horizontal on an axis that is substantially parallel to the plane formed by the upright mounted window, and any diagonal direction between two aforementioned directions. The exit panel 310 as illustrated is located below the sealed cavity, the first imaging assembly, and the second imaging assembly, but may be located anywhere on the indicia decoding device 400, including but not limited to an external surface opposite a platter, an external surface beneath the platter, an upper portion of a housing of the indicia decoding device 400, an upper external surface of the indicia decoding device 400, or a side surface (substantially parallel to a plane defined by a perspective of the section views of FIG. 2 and FIG. 3) of the indicia decoding device 400.

Figure 5:
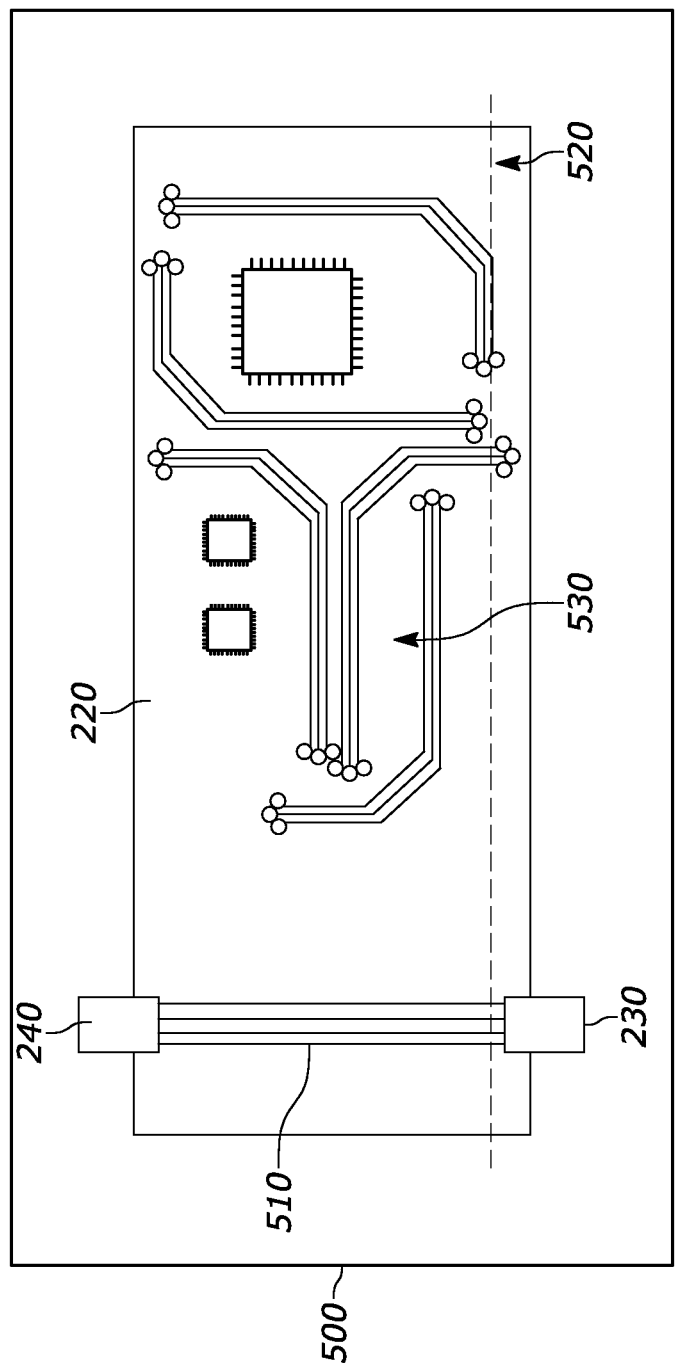
FIG. 5 illustrates a diagram of an example printed circuit board, according to embodiments of the present disclosure.

FIG. 5 illustrates a diagram 500 of an example printed circuit board 220 (PCB 220), according to embodiments of the present disclosure. The PCB 220 contains active image processing circuitry 530 configured to receive images of indicia, decode the indicia, and send payload data from the indicia to a host system. The PCB 220 is split across a boundary 520 of a sealed cavity. In FIG. 5 as illustrated, the sealed cavity is located above the boundary 520 and an exterior space is located below the boundary 520. Mounted to the PCB 220 inside the boundary 520 of the sealed cavity is a first port 240. The first port 240 is connected to a second port 230 that is mounted outside of the boundary 520 of the sealed cavity by a plurality of electrically conductive pathways 510 of the PCB 220 that are electrically isolated from the active image processing circuitry 530 and which pass signals from the first port 240 to the second port 230 without modification.

The first port 240 and the second port 230 may be serial communication ports. For example, the first port 240 may be a USB C port while the second port 230 is a USB A port.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. An indicia decoding device, comprising:
 a decode module;
 an upright mounted window;
 a generally horizontally mounted window;
 a first set of one or more imaging assemblies having a combined field of view (FOV) configured to be projected into a product scanning region of the indicia decoding device, wherein at least one imaging assembly of the first set of the one or more imaging assemblies is configured to capture first image data and transmit the first image data to the decode module;
 a sealed cavity housing the first set of the one or more imaging assemblies;
 a printed circuit board (PCB) located partially inside of the sealed cavity and partially outside of the sealed cavity;
 a first port on the PCB inside of the sealed cavity;
 a second port on the PCB outside of the sealed cavity; and
 a second set of one or more imaging assemblies within the sealed cavity, wherein signals from the second set of the one or more imaging assemblies to a host communicatively coupled to the second port bypass the decode module and are routed through a boundary of the sealed cavity via one or more electrically conductive paths of the PCB between the first port and the second port.

2. The indicia decoding device of claim 1, wherein the first port is one of a first Ethernet port or a first universal serial bus (USB) port, and the second port is one of a second Ethernet port or a second USB port.

3. The indicia decoding device of claim 1, wherein the signals from the second set of the one or more imaging assemblies to the host are passed unmodified from the first port to the second port.

4. The indicia decoding device of claim 3, wherein the one or more electrically conductive paths are electrically isolated from all other active circuitry of the PCB.

5. The indicia decoding device of claim 1, wherein the PCB includes processing circuitry configured to perform image analysis, and no other circuit board of the indicia decoding device contains processing circuitry configured to perform image analysis.

6. The indicia decoding device of claim 5, wherein results from the processing circuitry configured to perform image analysis are transmitted to the host.

7. The indicia decoding device of claim 1, wherein power for the second set of the one or more imaging assemblies is passed from the second port to the first port.

8. The indicia decoding device of claim 1, wherein an exit panel containing the second port faces in a direction chosen from a group consisting of:
 substantially vertically downwards;
 substantially vertically upwards;
 substantially horizontal on an axis that is substantially orthogonal to a plane defined by the upright mounted window, facing away from the plane defined by the upright mounted window;
 substantially horizontal on an axis that is substantially orthogonal to the plane defined by the upright mounted window, facing towards the plane defined by the upright mounted window; and
 substantially horizontal on an axis that is substantially parallel to the plane formed by the upright mounted window.

9. The indicia decoding device of claim 1, wherein the signals are not subject to any algorithmic modification while being routed via the one or more electrically conductive paths.

10. The indicia decoding device of claim 1, wherein the PCB forms at least a portion of a wall of the sealed cavity.

* * * * *